United States Patent [19]

Koishi et al.

[11] Patent Number: 5,400,315
[45] Date of Patent: Mar. 21, 1995

[54] OPTICAL DISK SYSTEM

[75] Inventors: Kenji Koishi, Takarazuka; Yoshinari Takemura; Shigeru Furumiya, both of Osaka, all of Japan

[73] Assignee: Matsushita Electric Industrial Co., Ltd., Osaka, Japan

[21] Appl. No.: 165,560

[22] Filed: Dec. 13, 1993

Related U.S. Application Data

[63] Continuation of Ser. No. 799,483, Nov. 27, 1991, abandoned.

[30] Foreign Application Priority Data

Nov. 27, 1990 [JP]  Japan ................................. 2-328711

[51] Int. Cl.$^6$ .............................................. G11B 7/00
[52] U.S. Cl. ................................... 369/124; 358/342; 358/343; 358/310
[58] Field of Search ................ 358/343, 326, 328, 323, 358/330, 319, 310, 342, 341; 369/60, 124; 360/19.1, 10.1, 20

[56] References Cited

U.S. PATENT DOCUMENTS

| | | | |
|---|---|---|---|
| 4,677,497 | 6/1987 | Yoshinaka | 358/310 |
| 4,918,523 | 4/1990 | Simon et al. | 358/133 |
| 5,027,222 | 6/1991 | Shinbo | 358/330 |
| 5,063,447 | 11/1991 | Takeda | 358/145 |
| 5,083,212 | 1/1992 | Owa et al. | 358/342 X |

FOREIGN PATENT DOCUMENTS

| | | |
|---|---|---|
| 0435289 | 7/1991 | European Pat. Off. |
| 1318390 | 12/1989 | Japan |
| 2057079 | 2/1990 | Japan |
| 2097968 | 11/1982 | United Kingdom |
| 1049961A | 10/1983 | U.S.S.R. |

OTHER PUBLICATIONS

IEEE Transactions of Consumer Electronics, vol. CE-34, No. 1, Feb. 1988, New York, US, pp. 72-76, Hioki et al 'Hi-Vision Optical Disc Player'.

Derwent Publications Ltd., London, GB; AN 84-169914.
European Search Report, 3131193.
"Optical Disc System for Wideband High Definition Video Signal" by K. Tachibana et al; IEEE Transactions on Consumer Electronics, vol. 35, No. 3, Aug. 1989.

*Primary Examiner*—Aristotelis Psitos
*Assistant Examiner*—Duncan Wilkinson
*Attorney, Agent, or Firm*—Lowe, Price, LeBlanc & Becker

[57] ABSTRACT

An analog-to-digital converter executes analog-to-digital conversion of a first analog video signal at a predetermined sampling frequency "fs". A time base converter converts a time base of an output signal from the analog-to-digital converter at a predetermined time base conversion frequency "ftci". A digital output signal from the time base converter is converted into a corresponding second analog video signal in response to a clock signal of a frequency corresponding to the frequency "ftci". The second analog video signal is converted into an FM video signal recorded on a video region of an optical disk. A binary audio digital signal is converted into a multi-level form digital audio signal. The binary audio digital signal has a data rate corresponding to the frequency "ftci". The multi-level form digital audio signal has a data rate "ftci/n" and $2^n$ discrete amplitude levels where "n" denotes a predetermined integer. The multi-level form digital audio signal is converted into a corresponding analog audio signal in response to the clock signal of the frequency corresponding to the frequency "ftci". The analog audio signal is converted into an FM audio signal recorded on an audio region of the optical disk. A data signal generator generates a digital data signal at a data rate "ftci/m" where "m" denotes a predetermined integer. The digital data signal is converted into a corresponding analog data signal in response to the clock signal of the frequency corresponding to the frequency "ftci". The analog data signal is converted into an FM data signal recorded on a data region of the optical disk.

6 Claims, 5 Drawing Sheets

OPTICAL DISK SYSTEM

This application is a continuation of application Ser. No. 07/799,483, filed Nov. 27, 1991, and now abandoned.

BACKGROUND OF THE INVENTION

This invention relates to an optical disk, a system for recording information on an optical disk, and a system for reproducing information from an optical disk.

An optical disk is a recording medium which can store a large amount of information. There are various optical disks, systems for recording information on an optical disk, and systems for reproducing information from an optical disk.

IEEE Transactions on Consumer Electronics, Vol. 35, No. 3, August 1989, disclose an optical disk system for a wideband high definition video signal which is one of typical optical systems.

As will be explained later, a prior art system for recording information on an optical disk, and a prior art system for reproducing information from an optical disk have some problems.

SUMMARY OF THE INVENTION

It is an object of this invention to provide an improved optical disk system.

A first aspect of this invention provides the following optical disk. In an information recording system comprising an analog-to-digital converter for executing analog-to-digital conversion of a first analog video signal at a predetermined sampling frequency "fs"; a time base converter for converting a time base of an output signal from the analog-to-digital converter at a predetermined time base conversion frequency "ftci"; digital-to-analog converting means for converting a digital output signal from the time base converter into a corresponding second analog video signal in response to a clock signal of a frequency corresponding to the time base conversion frequency "ftci"; FM modulating means for converting the second analog video signal into an FM video signal; a digital signal converter for converting a binary audio digital signal into a multi-level form digital audio signal, wherein the binary audio digital signal has a data rate corresponding to the time base conversion frequency "ftci", and the multi-level form digital audio signal has a data rate "ftci/n" and $2^n$ discrete amplitude levels where "n" denotes a predetermined integer; digital-to-analog converting means for converting the multilevel form digital audio signal into a corresponding analog audio signal in response to the clock signal of the frequency corresponding to the time base conversion frequency "ftci"; FM modulating means for converting the analog audio signal into an FM audio signal; a data signal generator for generating a digital data signal at a data rate "ftci/m" where "m" denotes a predetermined integer, wherein the generated digital data signal contains information representing positions of a video signal and an audio signal on programs; digital-to-analog converting means for converting the digital data signal into a corresponding analog data signal in response to the clock signal of the frequency corresponding to the time base conversion frequency "ftci"; FM modulating means for converting the analog data signal into an FM data signal: an optical disk comprises a video signal region for storing information of the FM video signal, an audio signal region for storing information of the FM audio signal, and a data signal region for storing the FM data signal.

A second aspect of this invention provides an optical-disk information recording system comprising an analog-to-digital converter for executing analog-to-digital conversion of an analog video signal at a predetermined sapling frequency "fs"; a time base converter for converting a time base of an output signal from the analog-to-digital converter at a predetermined time base conversion frequency "ftci"; a digital signal converter for converting a binary audio digital signal into a multi-level form digital audio signal, wherein the binary audio digital signal has a data rate corresponding to the time base conversion frequency "ftci", and the multi-level form digital audio signal has a data rate "ftci/n" and $2^n$ discrete amplitude levels where "n" denotes a predetermined integer; a data signal generator for generating a digital data signal at a data rate "ftci/m" where "m" denotes a predetermined integer, wherein the generated digital data signal contains information representing positions of a video signal and an audio signal on programs; a multiplexer for multiplexing an output signal from the time base converter, the multi-level form digital audio signal, and the digital data signal; a digital-to-analog converter for converting an output signal from the multiplexer in response to a clock signal of a frequency corresponding to the time base conversion frequency "ftci"; a low pass filter for processing an output signal from the digital-to-analog converter; an FM modulator for executing FM modulation in response to an output signal from the low pass filter; and means for recording information of an output signal from the FM modulator on an optical disk.

A third aspect of this invention provides an optical-disk information reproducing system comprising an FM demodulator for demodulating an FM signal reproduced from an optical disk; a low pass filter for processing an output signal from the FM demodulator; means for generating a clock signal of a predetermined time base conversion frequency "ftci" from a phase comparison reference signal contained in an output signal from the low pass filter; an analog-to-digital converter for executing analog-to-digital conversion of the output signal from the low pass filter in response to the clock signal of the time base conversion frequency "ftci"; a demultiplexer for demultiplexing an output signal from the analog-to-digital converter into a reproduced digital video signal, a reproduced digital audio signal, and a reproduced digital data signal, wherein the reproduced digital audio signal agrees with a multi-level form digital audio signal which has a data rate "ftci/n" and which has $2^n$ discrete amplitude levels where "n" denotes a predetermined integer; a time base converter for converting a time base of the reproduced digital video signal into a predetermined time base corresponding to a predetermined sampling frequency "fs"; a digital-to-analog converter for executing digital-to-analog conversion of an output signal from the time base converter at the predetermined sampling frequency "fs", and for reproducing an analog video signal on the basis of the output signal from the time base converter; a digital signal converter for converting the reproduced digital audio signal into a binary digital audio signal having a-data rate corresponding to the time base conversion frequency "ftci"; and a data signal demodulator for recovering a data signal from the reproduced digital data signal, the recovered data signal having a data rate "ftci/m" where "m" denotes a predetermined integer.

A fourth aspect of this invention provides an optical-disk information recording system comprising means for generating a first digital signal at a first predetermined data rate, the first digital signal representing video information; means for generating a second digital signal at a second predetermined data rate which is equal to the first predetermined data rate divided by a predetermined integer, the second digital signal representing audio information; means for multiplexing the digital video signal and the digital audio signal into a multiplexed digital signal; a digital-to-analog converter for converting the multiplexed digital signal into a multiplexed analog signal at a conversion clock frequency corresponding to the first predetermined data rate; and means for recording information represented by the multiplexed analog signal on an optical disk.

A fifth aspect of this invention provides a system for processing an analog signal reproduced from an optical disk, the reproduced analog signal having video information components, audio information components, and burst signal components, the burst signal components representing a predetermined data rate, the system comprising means for detecting the predetermined data rate from the burst signal components; an analog-to-digital converter for converting the reproduced analog signal into a reproduced digital signal at a conversion clock frequency corresponding to the detected predetermined data rate; means for demultiplexing the reproduced digital signal into a reproduced digital video signal and a reproduced digital audio signal; means for processing the reproduced digital video signal at a frequency corresponding to the detected predetermined data rate; and means for processing the reproduced digital audio signal at a frequency which is equal to the detected predetermined data rate divided by a predetermined integer.

DESCRIPTION OF THE PRIOR ART

Figure 1:
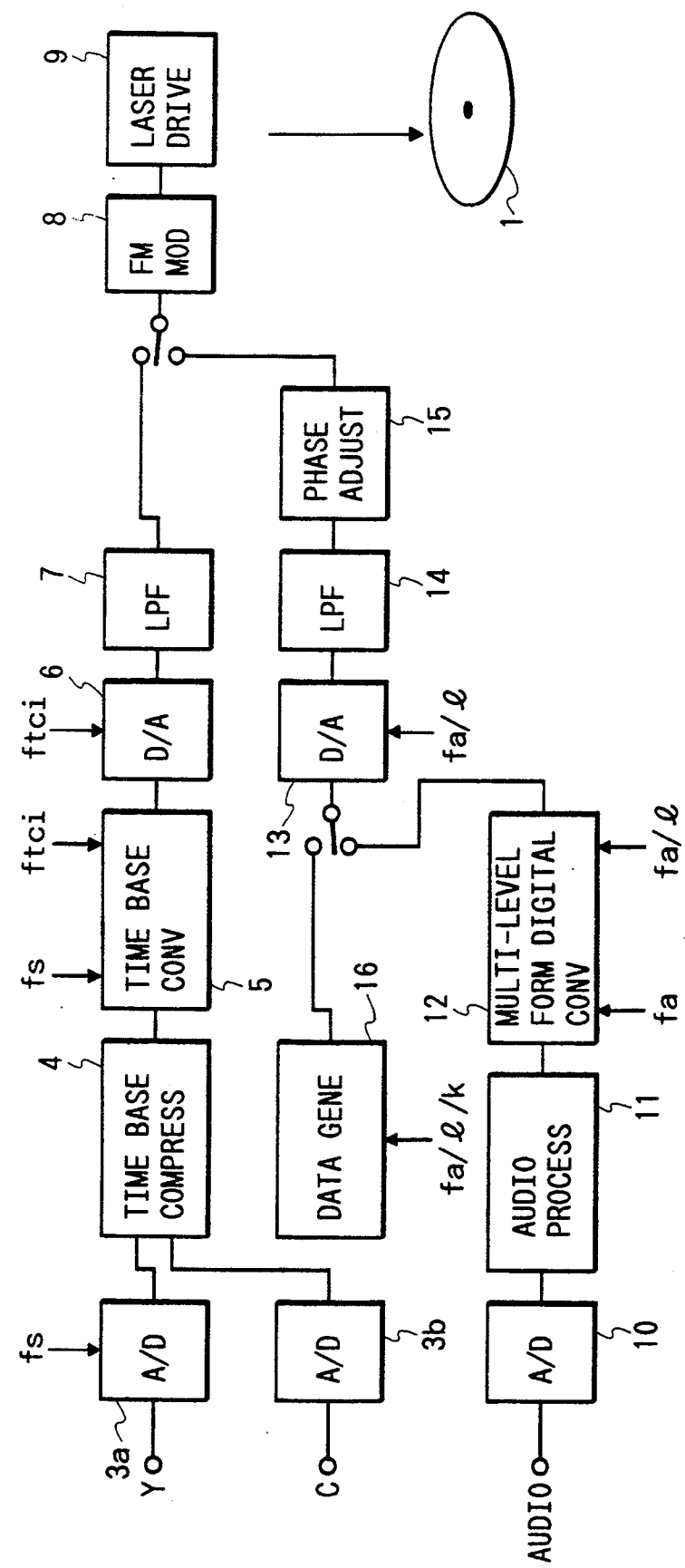
FIG. 1 is a block diagram of a prior art recording system.

With reference to FIG. 1, a prior art system for recording information on an optical disk 1 includes analog-to-digital (A/D) converters 3a and 3b receiving component analog video signals, that is, an analog luminance signal Y and an analog color signal C respectively. The analog luminance signal Y and the analog color signal C are converted by the A/D converters 3a and 3b into corresponding digital signals respectively. The A/D conversion of the analog luminance signal Y and the analog color signal C uses a sampling clock signal having a predetermined frequency "fs".

To enable the luminance signal and the color signal to be recorded on a common time base, the digital luminance signal and the digital color signal outputted from the A/D converters 3a and 3b are subjected to a time base compression process or a time base adjustment process, and are multiplexed or combined into a composite video signal by a time base compression circuit 4.

To enable segments of the video signal to be recorded on respective optical disk regions each having a predetermined time width, the composite video signal outputted from the time base compression circuit 4 is subjected to a time base conversion process by a time base conversion circuit 5. The time base conversion process uses the clock signal of the frequency "fs" and a second clock signal of a predetermined frequency "ftci". The digital video signal outputted from the time base conversion circuit 5 has a clock period corresponding to the time base conversion frequency "ftci".

The digital video signal outputted from the time base conversion circuit 5 is converted by a digital-to-analog (D/A) converter 6 into a corresponding analog signal. The D/A conversion of the digital video signal uses the clock signal of the frequency "ftci".

The analog video signal outputted from the D/A converter 6 is transmitted to an FM modulation circuit (a frequency-modulation circuit) 8 via a low pass filter 7 and a switch (no reference numeral). As will be made clear later, the analog video signal is multiplexed with an analog audio signal by the switch before entering the FM modulation circuit 8. The FM modulation circuit 8 modulates the frequency of a carrier in accordance with the received analog video signal, and converts the analog video signal into an FM video signal.

A laser drive circuit 9 drives a laser light source (not shown) in response to the output FM video signal from the FM modulation circuit 8 so that a laser light beam emitted from the laser light source will be modulated in accordance with the FM video signal. The laser light beam is applied to the optical disk 1 so that information represented by the FM video signal will be recorded on the optical disk 1.

An analog audio signal (an analog audio-information signal) is converted by an A/D converter 10 into a corresponding digital signal. The digital audio signal outputted from the A/D converter 10 is processed by an audio signal processor 11. Specifically, the audio signal processor 11 executes an error correction code adding process and an interleaving process on the digital audio signal. The audio signal processor 11 outputs a binary digital audio signal having a predetermined data rate "fa".

To enable segments of the audio signal to be recorded on respective optical disk regions each having a predetermined time width, the digital audio signal outputted from the audio signal processor 11 is converted by a digital signal conversion circuit 12 into a multi-level form digital signal which has "$2^l$" discrete amplitude levels and which has a predetermined data rate "fa/l", where the character "$2^l$" denotes the total number of the discrete amplitude levels and the character "l" denotes a predetermined integer. This signal conversion uses a clock signal having a frequency "fa" and a clock signal having a frequency "fa/l".

The multi-level form digital audio signal outputted from the digital signal conversion circuit 12 is transmitted to a D/A converter 13 via a switch 2A. The multilevel form digital audio signal outputted from the digital signal conversion circuit 12 is converted by the D/A converter 13 into a corresponding analog signal. The D/A conversion of the multi-level form digital audio signal uses the clock signal of the frequency "fa/l".

The analog audio signal outputted from the D/A converter 13 is transmitted to the FM modulation circuit 8 via a low pass filter 14, a phase adjustment circuit 15, and a switch 2B. The analog audio signal is multiplexed with the analog signal by the switch 2B before entering the FM modulation circuit 8. The FM modulation circuit 8 modulates the frequency of a carrier in accordance with the received analog audio signal, and converts the analog audio signal into an FM audio signal.

The laser drive circuit 9 drives the laser light source (not shown) in response to the output FM audio signal from the FM modulation circuit 8 so that the laser light beam emitted from the laser light source will be modulated in accordance with the FM audio signal. The laser light beam is applied to the optical disk 1 so that information represented by the FM audio signal will be recorded on the optical disk 1.

The low pass filter 7 for processing the video signal and the low pass filter 14 for processing the audio signal have different pass bands, so that the low pass filters 7 and 14 provide different group delay times. The phase adjustment circuit 15 serves to compensate for the difference between the group delay times provided by the low pass filters 7 and 14.

A data signal generation circuit 16 outputs a digital data signal at a predetermined data rate "fa/l/k", where the character "k" denotes a predetermined integer. The output digital data signal from the data signal generating circuit 16 represents addresses and time codes denoting positions of the video signal and the audio signal on programs. The output digital data signal from the data signal generation circuit 16 is multiplexed with the output audio signal from the digital signal conversion circuit 12 by the switch 2A, and is then transmitted to the D/A converter 13.

The prior art recording system of FIG. 1 has the following problems. Since the video time base conversion frequency "ftci" completely disagrees with the audio data rate "fa", it is necessary to provide the two D/A converters 6 and 13, and the two low pass filters 7 and 14. In addition, it is necessary to provide the phase adjustment circuit 15. In the event that the clock signal having the frequency "ftci" leaks to the system portion operated in response to the clock signal having the frequency "fa" and that the clock signal having the frequency "fa" leaks to the system portion operated in response to the clock signal having the frequency "ftci", there occurs crosstalk between the independent signals in the two system portions.

Figure 2:
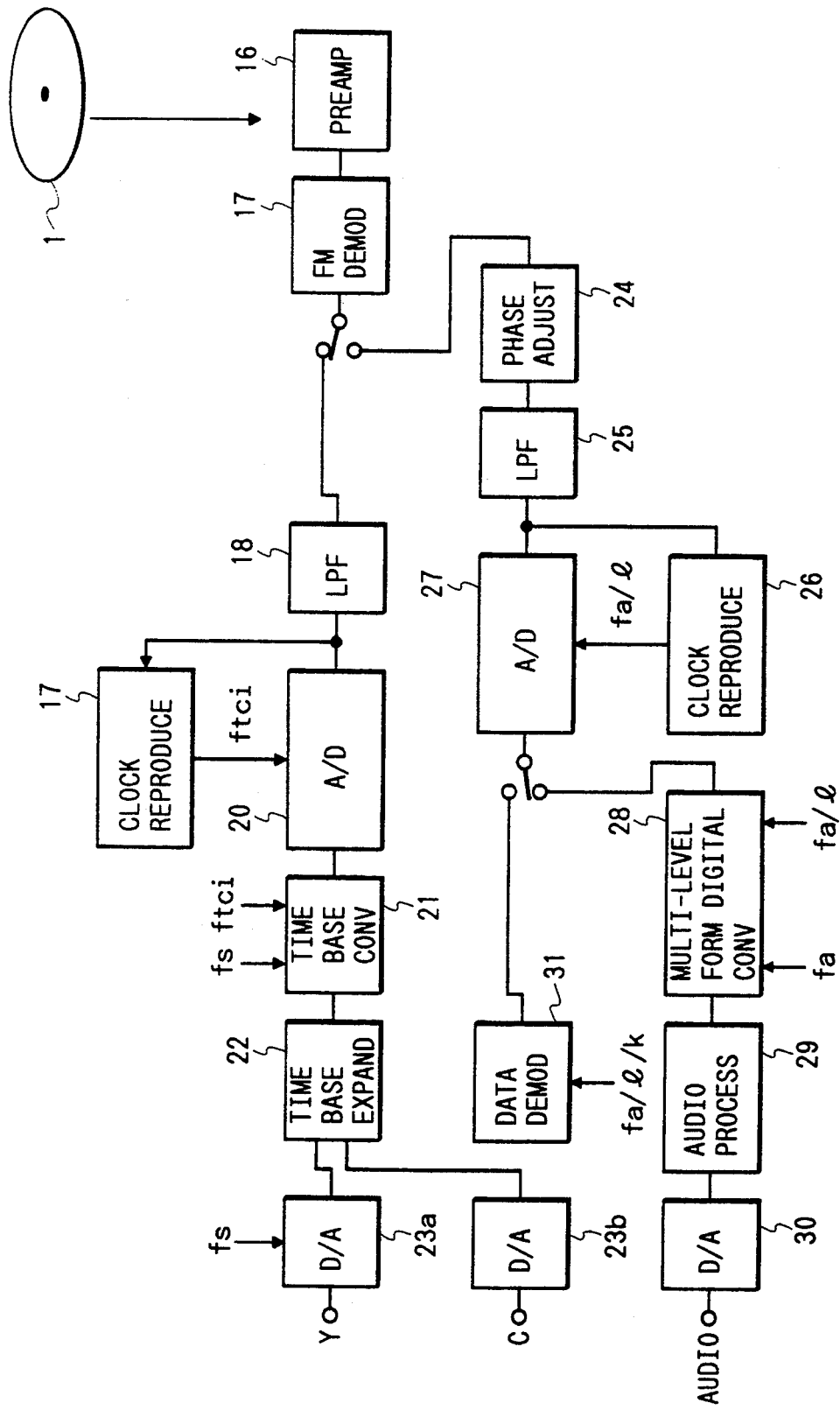
FIG. 2 is a block diagram of a prior art reproducing system.

With reference to FIG. 2, a prior art system for reproducing information from an optical disk 1 includes a preamplifier 50 and an FM demodulation circuit 17. An information signal reproduced from the optical disk 1 is transmitted to the FM demodulation circuit 17 via the preamplifier 50. The reproduced signal is subjected to an FM demodulation process by the FM demodulation circuit 17, being converted into a reproduced baseband analog signal.

The reproduced analog signal outputted from the FM demodulation circuit 17 is demultiplexed by a switch 51 into a reproduced analog video signal and a reproduced analog audio signal. The reproduced analog video signal is transmitted to a clock reproduction circuit 19 and an A/D converter 20 via a low pass filter 18. The reproduced analog audio signal is transmitted to a clock reproduction circuit 26 and an A/D converter 27 via a phase adjustment circuit 24 and a low pass filter 25.

The low pass filter 18 for processing the video signal and the low pass filter 25 for processing the audio signal have different pass bands, so that the low pass filters 18 and 25 provide different group delay times. The phase adjustment circuit 24 serves to compensate for the difference between the group delay times provided by the low pass filters 18 and 25.

The reproduced analog video signal is further processed as follows. The clock reproduction circuit 19 reproduces a clock signal from the reproduced analog video signal by using a PLL (phase-locked loop). The reproduced clock signal has the frequency "ftci". The reproduced analog video signal is converted by the A/D converter 20 into a corresponding digital signal. The A/D conversion of the reproduced analog video signal uses the clock signal having the frequency "ftci".

The reproduced digital video signal outputted from the A/D converter 20 is subjected to a time base conversion process by a time base conversion circuit 21. The time base conversion process uses the clock signal of the frequency "ftci" and a second clock signal of the sapling frequency "fs". The reproduced digital video signal outputted from the time base conversion circuit 21 has a data rate corresponding to the sampling frequency "fs".

The reproduced digital video signal outputted from the time base conversion circuit 21 is subjected to a time base expansion process or a time base adjustment process, and is demultiplexed into a reproduced digital luminance signal and a reproduced digital color signal by a time base expansion circuit 22. The reproduced digital luminance signal is converted by a D/A converter 23a into a corresponding reproduced analog luminance signal Y. The reproduced digital color signal is converted by a D/A converter 23b into a corresponding reproduced analog color signal C. The D/A conversion of the reproduced digital luminance signal and the reproduced digital color signal uses the sapling clock signal of the frequency "fs".

The reproduced analog audio signal is further processed as follows. The clock reproduction circuit 26 reproduces a clock signal from the reproduced analog audio signal by using a PLL (phase-locked loop). The reproduced clock signal has the frequency "fa/l". The reproduced analog audio signal is converted by the A/D converter 27 into a corresponding digital signal. The A/D conversion of the reproduced analog audio signal uses the clock signal having the frequency "fa/l".

The reproduced digital audio signal outputted from the A/D converter 27 is demultiplexed by a switch 52 into a reproduced digital pure audio signal and a reproduced digital data signal. The reproduced digital pure audio signal agrees with a multi-level form digital audio signal. The reproduced digital pure audio signal is transmitted to a digital signal conversion circuit 28. The reproduced digital data signal is transmitted to a data signal demodulation circuit 31.

The reproduced digital pure audio signal, that is, the reproduced multi-level form digital audio signal, is converted by the digital signal conversion circuit 28 into a corresponding binary digital signal which has the data rate "fa". This signal conversion uses a clock signal having the frequency "fa" and the clock signal having the frequency "fa/1".

The digital audio signal outputted from the digital signal conversion circuit 28 is processed by an audio signal processor 29. Specifically, the audio signal processor 29 executes an error correction process and a de-interleaving process on the digital audio signal.

The reproduced digital audio signal outputted from the audio signal processor 29 is converted by a D/A converter 30 into a corresponding reproduced analog audio signal.

The reproduced digital data signal is subjected to a demodulation process by the data signal demodulation circuit 31 so that data is recovered from the digital data signal. The demodulation process uses a clock signal of the frequency "fa/1".

The prior art reproducing system of FIG. 2 has the following problems. Since the video time base conversion frequency "ftci" completely disagrees with the audio data rate "fa", it is necessary to provide the two A/D converters 20 and 27, and the two low pass filters 18 and 25. In addition, it is necessary to provide the phase adjustment circuit 24. In the event that the clock signal having the frequency "ftci" leaks to the system portion operated in response to the clock signal having the frequency "fa" and that the clock signal having the frequency "fa" leaks to the system portion operated in response to the clock signal having the frequency "ftci", there occurs crosstalk between the independent signals in the two system portions.

DESCRIPTION OF THE PREFERRED EMBODIMENTS

Figure 3:
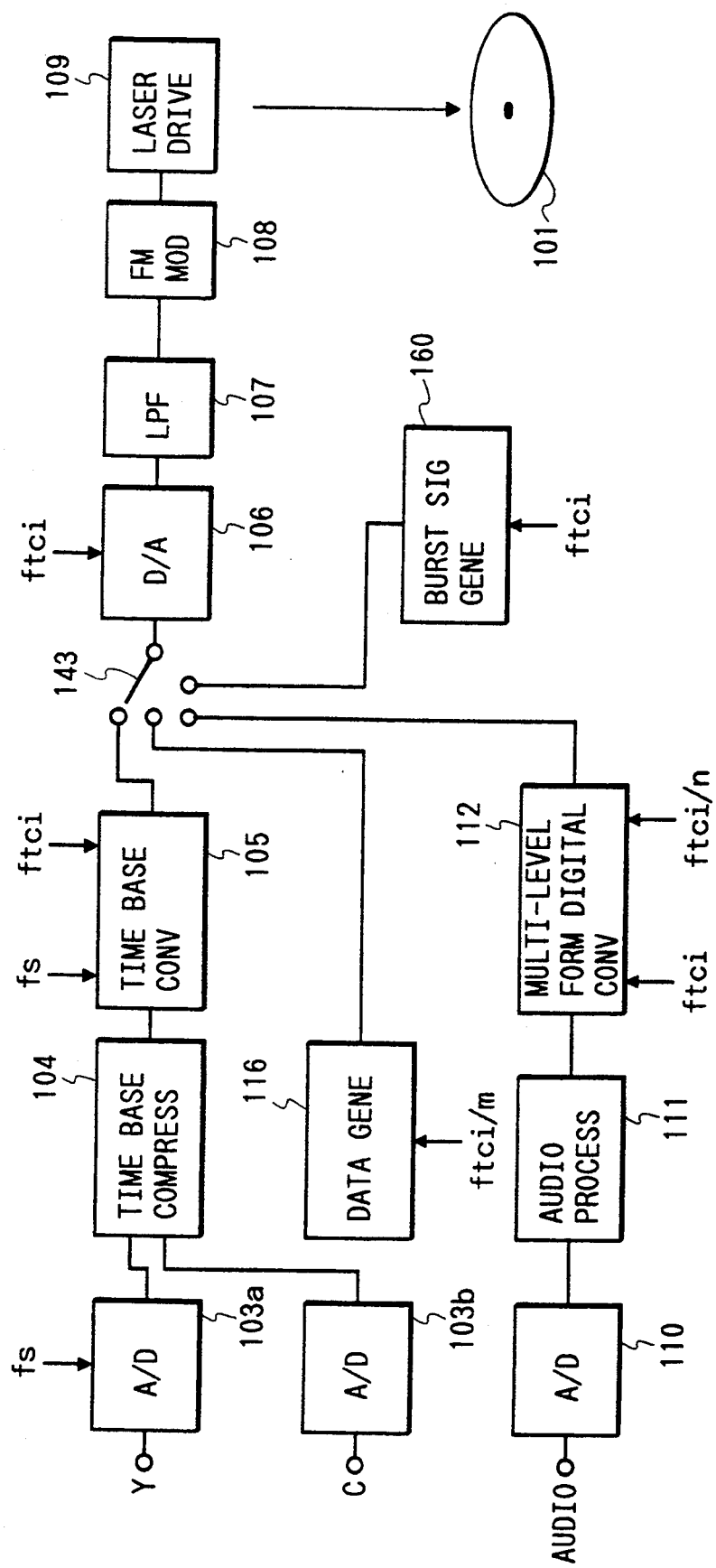
FIG. 3 is a block diagram of a recording system according to an embodiment of this invention.

With reference to FIG. 3, a system for recording information on an optical disk 101 includes analog-to-digital (A/D) converters 103a and 103b receiving component analog video signals, that is, an analog luminance signal Y and an analog color signal C respectively. The analog luminance signal Y and the analog color signal C are converted by the A/D converters 103a and 103b into corresponding digital signals respectively. The A/D conversion of the analog luminance signal Y and the analog color signal C uses a sampling clock signal having a predetermined frequency "fs".

To enable the luminance signal and the color signal to be recorded on a common time base, the digital luminance signal and the digital color signal outputted from the A/D converters 103a and 103b are subjected to a time base compression process or a time base adjustment process, and are multiplexed or combined into a composite video signal by a time base compression circuit 104.

To enable segments of the video signal to be recorded on respective optical disk regions each having a predetermined time width, the composite video signal outputted from the time base compression circuit 104 is subjected to a time base conversion process by a time base conversion circuit 105. The time base conversion process uses the clock signal of the frequency "fs" and a second clock signal of a predetermined frequency "ftci". The digital video signal outputted from the time base conversion circuit 105 has a clock period corresponding to the time base conversion frequency "ftci".

An analog audio signal (an analog audio-information signal) is converted by an A/D converter 110 into a corresponding digital signal. The digital audio signal outputted from the A/D converter 110 is processed by an audio signal processor 111. Specifically, the audio signal processor 111 executes an error correction code adding process and an interleaving process on the digital audio signal. The audio signal processor 111 outputs a binary digital audio signal having a predetermined data rate which agrees with or corresponds to the time base conversion frequency "ftci".

To enable segments of the audio signal to be recorded on respective optical disk regions each having a predetermined time width, the digital audio signal outputted from the audio signal processor 111 is converted by a digital signal conversion circuit 112 into a multi-level form digital signal which has "$2^n$" discrete amplitude levels and which has a predetermined data rate "ftci/n", where the character "$2^n$" denotes the total number of the discrete amplitude levels and the character "n" denotes a predetermined integer. This signal conversion uses the clock signal having the frequency "ftci" and a clock signal having the frequency "ftci/n".

A data signal generation circuit 116 outputs a digital data signal at a predetermined data rate "ftci/m", where the character "m" denotes a predetermined integer. The output digital data signal from the data signal generation circuit 116 represents addresses and time codes denoting positions of the video signal and the audio signal on programs.

The output digital video signal from the time base conversion circuit 105, the output digital audio signal from the digital signal conversion circuit 112, and the output digital data signal from the data signal generation circuit 116 are multiplexed by a multiplexer switch 143 in a time division fashion such that they will be recorded on video signal regions, audio signal regions, and data signal regions of the optical disk 101 respectively.

A burst signal generation circuit 160 includes a frequency divider which divides the frequency "ftci" of the clock signal by a predetermined integer to generate a burst signal of a predetermined frequency from the clock signal of the frequency "ftci". The burst signal is outputted from the burst signal generation circuit 160 to the multiplexer switch 143. A portion of the burst signal is added by the multiplexer switch 143 to a former part of each of 1-line segments of the multiplexed signal containing the video components, the audio components, and the data components. By the function of a low pass filter 107 which will be explained later, the burst components are shaped into a sinusoidal waveform.

The output digital signal from the multiplexer switch 143 is converted by a digital-to-analog (D/A) converter 106 into a corresponding analog signal. The D/A conversion of the digital video signal uses the clock signal of the frequency "ftci".

The output analog signal from the D/A converter 106 is transmitted to an FM modulation circuit (a frequency-modulation circuit) 108 via the low pass filter 107. The FM modulation circuit 108 modulates the frequency of a carrier in accordance with the received analog signal, and converts the analog signal into an FM signal.

A laser drive circuit 109 drives a laser light source (not shown) in response to the output FM signal from the FM modulation circuit 108 so that a laser light beam emitted from the laser light source will be modulated in accordance with the FM signal. The laser light beam is applied to the optical disk 101 so that information represented by the FM signal will be recorded on the optical disk 101.

The recording system of FIG. 3 has the following advantages. Only a single D/A converter 106 suffices. In addition, only a single low pass filter 107 suffices. Since processing the video signal, processing the audio signal, and processing the data signal are executed basically at a common clock frequency corresponding to the time base conversion frequency "ftci", it is possible to prevent crosstalk which would be caused if different clock signals are used and they leak.

Figure 4:
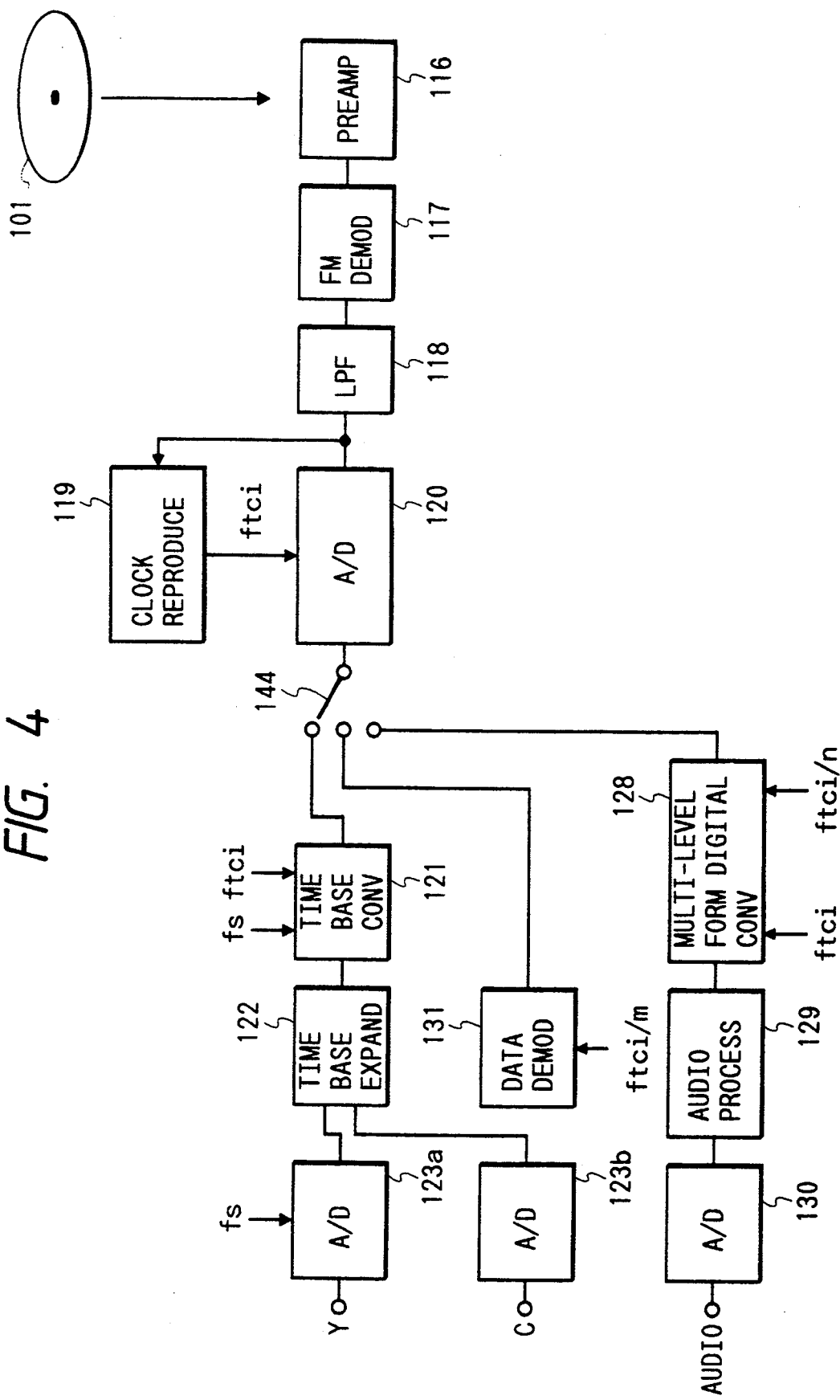
FIG. 4 is a block diagram of a reproducing system according to an embodiment of this invention.

With reference to FIG. 4, a system for reproducing information from an optical disk 101 includes a preamplifier 132 and an FM demodulation circuit 117. An information signal reproduced from the optical disk 101 is transmitted to the FM demodulation circuit 117 via the preamplifier 132. The reproduced signal is subjected to an FM demodulation process by the FM demodulation circuit 117, being converted into a reproduced baseband analog signal.

The reproduced analog signal outputted from the FM demodulation circuit 117 is transmitted to a clock reproduction circuit 119 and an A/D converter 120 via a low pass filter 118. The clock reproduction circuit 119 reproduces a clock signal from the reproduced analog signal by using a PLL (phase-locked loop). The reproduced clock signal has the frequency "ftci". Specifically, the clock reproduction circuit 119 extracts a fixed-frequency burst signal, that is, a phase comparison reference signal, from the reproduced analog signal. The clock reproduction circuit 119 locks the phase of a base clock signal to the phase of the phase comparison reference signal, and the base clock signal locked to the phase comparison reference signal is used as the reproduced clock signal having the frequency "ftci". The reproduced clock signal having the frequency "ftci" is outputted from the clock reproduction circuit 119.

The reproduced analog signal is converted by the A/D converter 120 into a corresponding digital signal. The A/D conversion of the reproduced analog signal uses the clock signal having the frequency "ftci".

The reproduced digital video signal outputted from the A/D converter 20 is demultiplexed by a demultiplexer switch 144 into a signal reproduced from the video signal regions of the optical disk 101 (a reproduced digital video signal), a signal reproduced from the audio signal regions of the optical disk 101 (a reproduced digital audio signal), and a signal reproduced from the data signal regions of the optical disk 101 (a reproduced digital data signal).

The reproduced digital video signal is transmitted from the demultiplexer switch 144 to a time base conversion circuit 121, and is subjected to a time base conversion process by the time base conversion circuit 121. The time base conversion process uses the clock signal of the frequency "ftci" and a second clock signal of the sampling frequency "fs". The reproduced digital video signal outputted from the time base conversion circuit 121 has a data rate corresponding to the sapling frequency "fs".

The reproduced digital video signal outputted from the time base conversion circuit 121 is subjected to a time base expansion process or a time base adjustment process, and is demultiplexed into a reproduced digital luminance signal and a reproduced digital color signal by a time base expansion circuit 122. The reproduced digital luminance signal is converted by a D/A converter 123a into a corresponding reproduced analog luminance signal Y. The reproduced digital color signal is converted by a D/A converter 123b into a corresponding reproduced analog color signal C. The D/A conversion of the reproduced digital luminance signal and the reproduced digital color signal uses the sampling clock signal of the frequency "fs".

The reproduced digital audio signal separated by the demultiplexer switch 144 agrees with a multi-level form digital audio signal having the data rate "ftci/n". The reproduced digital audio signal is transmitted from the demultiplexer switch 144 to a digital signal conversion circuit 128. The reproduced digital audio signal, that is, the reproduced multi-level form digital audio signal, is converted by the digital signal conversion circuit 128 into a corresponding binary digital audio signal which has the data rate "ftci". This signal conversion uses a clock signal having the frequency "ftci/n" and the clock signal having the frequency "ftci".

The digital audio signal outputted from the digital signal conversion circuit 128 is processed by an audio signal processor 129. Specifically, the audio signal processor 129 executes an error correction process and a de-interleaving process on the digital audio signal.

The reproduced digital audio signal outputted from the audio signal processor 129 is converted by a D/A converter 130 into a corresponding reproduced analog audio signal.

The reproduced digital data signal is transmitted from the demultiplexer switch 144 to a data signal demodulation circuit 131, and is subjected to a demodulation process by the data signal demodulation circuit 131 so that data is recovered from the digital data signal. The demodulation process uses a clock signal of the frequency "ftci/m".

The reproducing system of FIG. 4 has the following advantages. Only a single A/D converter 120 suffices. In addition, only a single low pass filter 118 suffices. Since processing the video signal, processing the audio signal, and processing the data signal are executed basically at a common clock frequency corresponding to the time base conversion frequency "ftci", it is possible to prevent crosstalk which would be caused if different clock signals are used and they leak.

Figure 5:
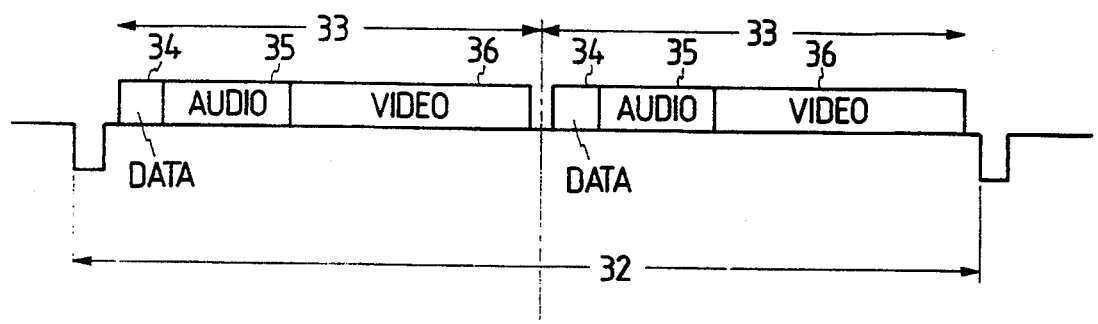
FIG. 5 is a time domain diagram showing the contents of a signal recorded on the optical disk of FIG. 3.

A description will now be given of the formats of various signals and the optical disk 101. The FM signal recorded on the optical disk 101 is separated into a sequence of fields. As shown in FIG. 5, a 1-field segment 32 of the recorded FM signal has two similar sets 33 each having a sequence of a data signal 34, an audio signal 35, and a video signal 36. The data signal 34, the audio signal 35, and the video signal 36 are recorded on a data signal region, an audio signal region, and a video signal region of the optical disk 101 respectively.

Figure 6:
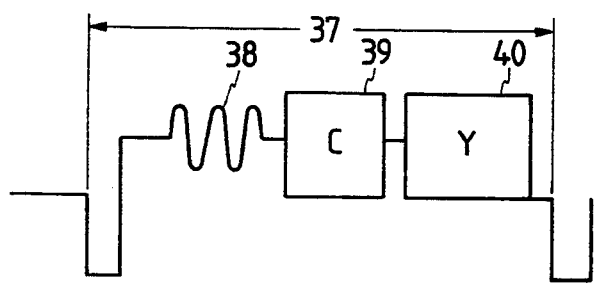
FIG. 6 is a time domain diagram showing the contents of a baseband video signal inputted into the FM modulation circuit of FIG. 3.

The video signal components of the signal inputted into the FM modulation circuit 108 are separated into a sequence of lines. As shown in FIG. 6, a 1-line segment 37 of the video signal has a sequence of a phase comparison reference signal 38, a color signal 39 (a color signal C), and a luminance signal 40 (a luminance signal Y). The phase comparison reference signal 38 agrees with a sinusoidal burst signal having a predetermined frequency which equals the time base conversion frequency "ftci" divided by a predetermined integer. As described previously, the clock signal having the frequency "ftci" is reproduced by locking the phase of a basic clock signal to the phase of the phase comparison reference signal 38.

Figure 7:
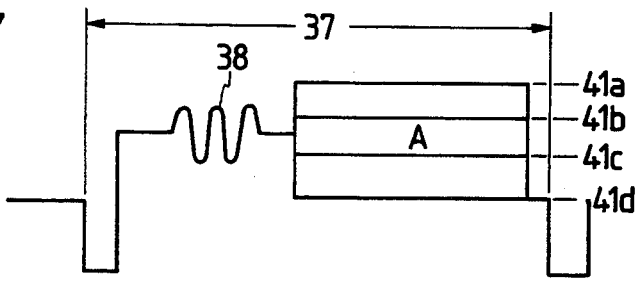
FIG. 7 is a time domain diagram showing the contents of a baseband audio signal inputted into the FM modulation circuit of FIG. 3.

The audio signal components of the signal inputted into the FM modulation circuit 108 are separated into a sequence of lines. As shown in FIG. 7, a 1-line segment 37 of the audio signal has a sequence of a phase comparison reference signal 38 and a multilevel form digital audio signal A. The multi-level form digital audio signal A has, for example, four discrete amplitude levels 41a, 41b, 41c, and 41d. In this case, the multi-level form digital audio signal A has a data rate "ftci/2" so that it can be demodulated in response to a clock signal of a frequency equal to the time base conversion frequency "ftci".

Figure 8:
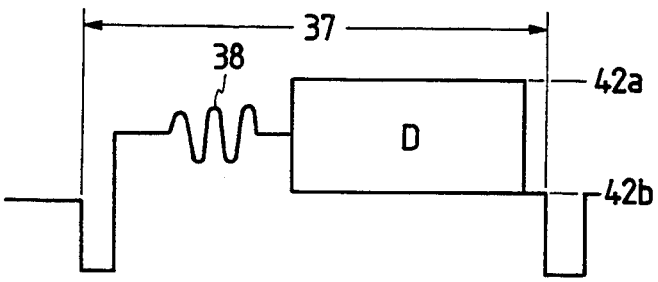
FIG. 8 is a time domain diagram showing the contents of a baseband data signal inputted into the FM modulation circuit of FIG. 3.

The data signal components of the signal inputted into the FM modulation circuit 108 are separated into a sequence of lines. As shown in FIG. 8, a 1-line segment 37 of the data signal has a sequence of a phase comparison reference signal 38 and a binary digital data signal D. The binary digital data signal D contains codes of addresses and time codes denoting positions of a video signal and an audio signal on programs. The binary digital data signal D has two discrete amplitude levels 42a and 42b. The binary digital data signal D has the data rate "ftci/m" so that it can be demodulated in response to a clock signal of a frequency equal to the time base conversion frequency "ftci".

What is claimed is:

1. An optical-disk information recording system comprising:

an analog-to-digital converter for executing analog-to-digital conversion of an analog video signal at a predetermined sampling frequency "fs" for producing a digital video signal;

a time base converter for converting a time base of the digital video signal output signal from the analog-to-digital converter at a predetermined time base conversion frequency "ftci" and for outputting a converted digital video signal at a clock period corresponding to said time base conversion frequency of "ftci";

a digital signal converter for converting a binary audio digital signal into a multi-level form digital audio signal, wherein the binary audio digital signal has a data rate corresponding to the time base conversion frequency "ftci", and the multi-level form digital audio signal has a data rate of "ftci/2", one half the data rate of the predetermined time base conversion frequency, and $2^n$ discrete amplitude levels where "n" denotes a predetermined integer;

a data signal generator for generating a digital data signal at a data rate "ftci/2", one half the data rate of the predetermined time base conversion frequency, wherein the generated digital data signal contains information representing positions of a video signal and an audio signal on programs;

a burst signal generator for generating a digital burst signal and responsive to a clock signal having a frequency "ftci/2";

a multiplexer for multiplexing the converted digital video signal from the time base converter, the multi-level form digital audio signal, the digital data signal, and the digital burst signal from the burst signal generator and providing a multiplexed signal;

only a single digital-to-analog converting means, said digital-to-analog converting means converting the multiplexed signal output from the multiplexer in response to a clock signal of a frequency corresponding to the time base conversion frequency "ftci" to provide a single analog signal representing the converted digital video signal, the multi-level form digital audio signal, the digital data signal and the digital burst signal;

only a single low pass filter for providing a signal to be recorded on an optical disk, said low pass filter processing the single analog signal from the digital-to-analog converting means;

an FM modulator for executing FM modulation in response to an output signal from the low pass filter; and means for recording information of an output signal from the FM modulator on the optical disk.

2. An optical-disk information recording system as recited in claim 1, wherein n=2, and:

said digital signal converter functions for converting said binary audio digital signal having a data rate "ftci" into a multi-level form digital audio signal having a data rate "ftci/2" and having four discrete amplitude levels.

3. An optical-disk information recording system as recited in claim 1, wherein said time base converter comprises means responsive to a converter clock signal having a frequency "ftci";

said digital signal converter for converting a binary audio digital signal comprises means responsive to first and second clock signals having respective frequencies "ftci" and "ftci/2"; and said data signal generator comprises means responsive to a third clock signal having a frequency "ftci/2".

4. An optical-disk information reproducing system comprising:

an FM demodulator for demodulating an FM signal reproduced from an optical disk;

only a single low pass filter for processing an output signal from the FM demodulator;

means for generating a clock signal of a predetermined time base conversion frequency "ftci" from a phase comparison reference signal contained in an output signal from the low pass filter;

only a single analog-to-digital converter for executing analog-to-digital conversion of the signal reproduced from the optical disk by converting the output signal from the low pass filter in response to the clock signal of the time base conversion frequency "ftci";

a demultiplexer for demultiplexing an output signal from the analog-to-digital converter into a reproduced digital video signal, a reproduced digital data signal, and a reproduced multi-level digital audio signal having a data rate "ftci/2" and 4 discrete amplitude levels;

a time base converter responsive to a clock signal having a frequency "ftci" for converting a time base of the reproduced digital video signal into a predetermined time base corresponding to a predetermined sampling frequency "fs";

a digital-to-analog converter for executing digital-to-analog conversion of an output signal from the time base converter at the predetermined sampling frequency "fs", and for reproducing an analog video signal on the basis of the output signal from the time base converter;

a digital signal converter for converting the reproduced digital audio signal into a binary digital audio signal having a data rate corresponding to the time base conversion frequency "ftci"; and a data signal demodulator for recovering a data signal from the reproduced digital data signal, the data signal demodulator responsive to a clock signal having a frequency "ftci/2".

5. An optical-disk information recording system comprising:

means for generating a first digital signal at a first predetermined data rate, the first digital signal representing video information;

means for generating a second digital signal at a second predetermined data rate which is equal to one half the first predetermined data rate, the second digital signal representing audio information;

burst signal generating means for generating a digital burst signal representing the first predetermined data rate;

means for multiplexing the digital video signal, the digital audio signal, and the digital burst signal into a multiplexed digital signal;

only a single digital-to-analog converter for converting the multiplexed digital signal into a single multiplexed analog signal at a conversion clock frequency corresponding to the first predetermined data rate and representing the first digital signal, the second digital signal and the digital burst signal;

only a single low pass filter for processing the single multiplexed analog signal from the single digital-to-analog converter; and means for recording information represented by an output signal from the low pass filter on an optical disk.

6. An optical-disk information recording system as recited in claim 5, wherein said means for generating a first digital signal representing video information comprises means responsive to a first clock signal having a first predetermined frequency ftci, said means for generating a second digital signal representing audio information comprises means responsive to a second clock signal having a second predetermined frequency equal to one half said first predetermined frequency, ftci/2, and said burst signal generating means comprises means responsive to a third clock signal having said second predetermined frequency, ftci/2.

* * * * *